(12) United States Patent
Levy (10) Patent No.: US 9,718,425 B2
(45) Date of Patent: Aug. 1, 2017

(54) CRASH DETECTION

(71) Applicant: Infineon Technologies AG, Neubiberg (DE)

(72) Inventor: David Levy, Wernberg (AT)

(73) Assignee: Infineon Technologies AG, Neubiberg (DE)

( * ) Notice: Subject to any disclaimer, the term of this patent is extended or adjusted under 35 U.S.C. 154(b) by 113 days.

(21) Appl. No.: 14/459,945

(22) Filed: Aug. 14, 2014

(65) Prior Publication Data

US 2015/0051796 A1  Feb. 19, 2015

Related U.S. Application Data

(60) Provisional application No. 61/865,999, filed on Aug. 14, 2013.

(51) Int. Cl.
*G06F 17/00* (2006.01)
*B60R 21/013* (2006.01)

(52) U.S. Cl.
CPC .................. *B60R 21/013* (2013.01)

(58) Field of Classification Search
CPC ...... B60R 21/0136; B60R 2021/01013; B60R 21/013

USPC ..................................................... 701/46, 91
See application file for complete search history.

(56) References Cited

U.S. PATENT DOCUMENTS

| | | | | |
|---|---|---|---|---|
| 5,521,822 A | * | 5/1996 | Wang | B60R 21/0132 180/282 |
| 5,538,099 A | | 7/1996 | Blackburn et al. | |
| 5,999,871 A | * | 12/1999 | Liu | B60R 21/013 280/731 |
| 6,219,606 B1 | * | 4/2001 | Wessels | B60R 21/013 180/271 |
| 6,438,475 B1 | | 8/2002 | Gioutsos et al. | |
| 6,460,882 B1 | * | 10/2002 | Andres | B60R 21/013 280/735 |
| 6,848,712 B2 | * | 2/2005 | Link | B60R 21/013 180/282 |
| 7,484,756 B2 | | 2/2009 | Le et al. | |
| 8,321,092 B2 | | 11/2012 | Browne et al. | |

\* cited by examiner

*Primary Examiner* — Muhammad Shafi
(74) *Attorney, Agent, or Firm* — Schiff Hardin LLP (57) ABSTRACT

An implementation determines crash severity quantifier values based on crash sensor samples and determining an air bag firing based at least on the crash severity quantifier values.

10 Claims, 8 Drawing Sheets

CRASH DETECTION

RELATED APPLICATIONS

This Non-Provisional application claims priority of Provisional Application 61/865,999, which was filed on Aug. 14, 2013. The entire contents of the indicated Provisional application are hereby incorporated herein by reference.

BACKGROUND

With steadily increasing traffic, airbags are nowadays used in most vehicles. An airbag is fired based upon the detection of a crash to safe the health and life of the passengers. Typically, crash sensors such as accelerometers or pressure sensors provide signals to an ECU (electronic control unit) or other processing units to determine the occurrence of a crash. While many ways of detecting a crash occurrence from the crash sensor signal exist, complexity of the system as well as avoidance of false air bag firings are both factors which have to be balanced in order to achieve an efficient and secure crash detection system.

SUMMARY

According to a first aspect, a method comprises determining crash severity quantifier values based on crash sensor samples and detecting a crash based at least on the crash severity quantifier values.

According to a second aspect, a method of determining a crash occurrence comprises receiving samples of a crash sensor signal. In a first processing path, a first digital representation indicative of an amount of the crash severity is generated for each sample. A crash occurrence is determined based on the first digital representations.

According to a further aspect, a device comprises a processing path to generate for each sample of consecutively sampled crash sensor samples a respective digital representations indicative of how much the respective sample exceeds a first threshold and a digital filter configure to receive the digital representations and to provide an output signal based on the digital representations. The device generates crash detection signal based on the output signal of the digital filter.

According to a further aspect, a device comprises a first crash determining path configured to receive input samples based on a sensor signal of a crash sensor and a second crash determining path configured to receive the input samples based on the sensor signal of the crash sensor. The device is configured such that the first crash determining path determines in a first crash severity regime an occurrence of a crash earlier than the second crash path would determine the crash occurrence and such that a crash occurrence in a second crash severity regime is determined by the second crash determining path.

DETAILED DESCRIPTION

The following detailed description explains exemplary embodiments of the present invention. The description is not to be taken in a limiting sense, but is made only for the purpose of illustrating the general principles of embodiments of the invention while the scope of protection is only determined by the appended claims.

In the exemplary embodiments shown in the drawings and described below, any direct connection or coupling between functional blocks, devices, components or other physical or functional units shown in the drawings or described herein can also be implemented by an indirect connection or coupling. Functional blocks may be implemented in hardware, firmware, software, or a combination thereof.

Further, it is to be understood that the features of the various exemplary embodiments described herein may be combined with each other, unless specifically noted otherwise.

In the various figures, identical or similar entities, modules, devices etc. may have assigned the same reference number. Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

In the described embodiments, various specific views or schematic views of elements, devices, features, etc. are shown and described for a better understanding of embodiments. It is to be understood that such views may not be drawn to scale. Furthermore, such embodiments may not show all features, elements etc. contained in one or more figures with a same scale, i.e. some features, elements etc. may be shown oversized such that in a same figure some features, elements, etc. are shown with an increased or decreased scale compared to other features, elements etc.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

Figure 1:
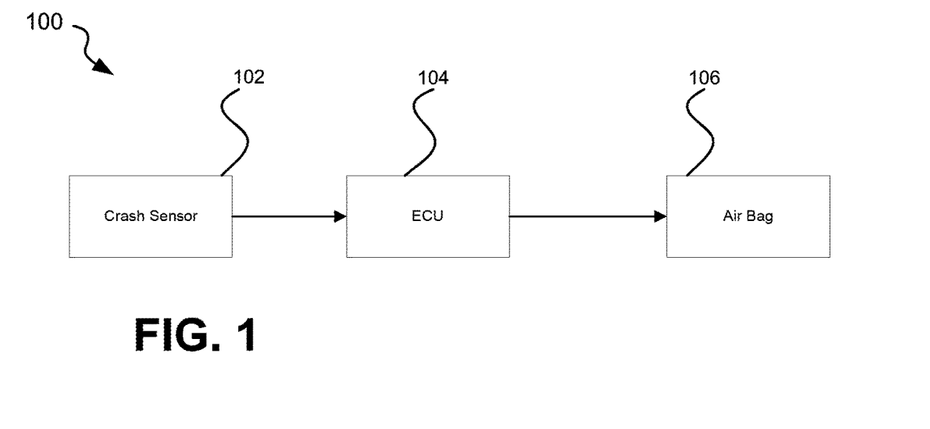
FIG. 1 shows a block diagram according to an embodiment.

The embodiments described below are directed to a new concept for detecting a crash occurrence. FIG. 1 shows an embodiment of an airbag system 100 including a crash sensor 102 an ECU (electronic control unit) 104 and an airbag 106. System 100 may be incorporated in vehicles such as cars, trucks, etc. An output of the crash sensor 102 is coupled to an input of the ECU 104 to transfer output signals from the crash sensor 102 to the ECU 104. The output signals of crash sensor 102 may include analog signals or digital signals. The crash sensor 102 may include any type of sensors capable to be used as sensors for detecting crash occurrences such as accelerometers, pressure sensors etc.

The ECU 102 receives the output signals from the crash sensor 104 and starts processing the information provided by the signal. In case the output signal is received as analog signal, the ECU 104 may provide an analog-to-digital conversion prior to the processing. As will be described in more detail below, the ECU 104 may use a new concept to determine a crash occurrence based on the received crash sensor signals. In case the ECU 104 determines a crash occurrence, the ECU 104 provides from an output of the ECU 104 an airbag firing signal to the airbag 106. The air bag firing signal is received at the airbag 106 and firing of the airbag is started based on the receiving of the airbag firing signal.

Figure 2:
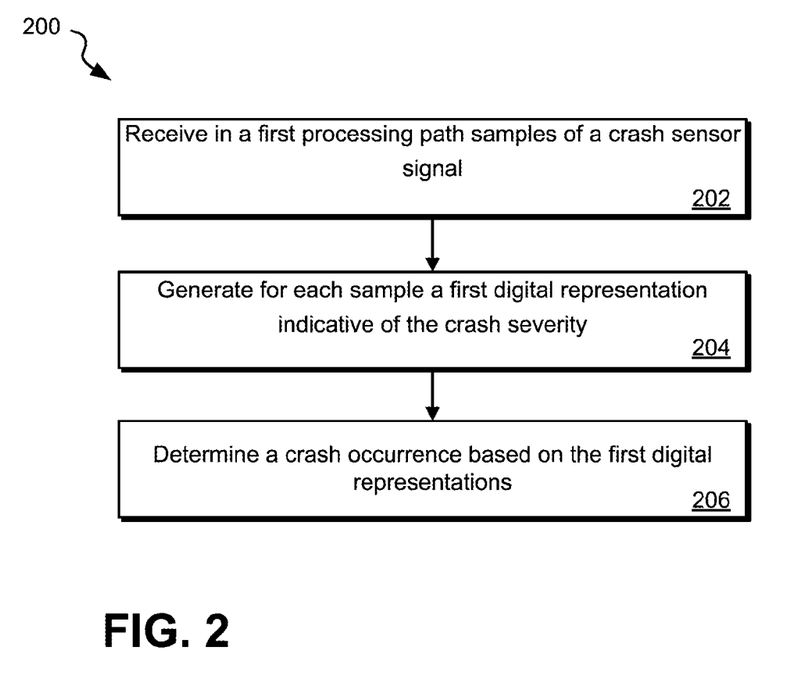
FIG. 2 shows a flow chart diagram according to an embodiment.

Referring now to FIG. 2, an embodiment of determining a crash occurrence will be described. FIG. 2 shows a flow diagram starting at 202 with the receiving of samples of a crash sensor signal in a first signal path. In some embodiments, the crash sensor signal may be the rough sensor signal, in some embodiments the crash sensor signal may be a crash sensor signal resulting from a pre-processing of the rough sensor signal. Pre-processing of the rough sensor signal may be provided by the crash sensor 102, by the ECU 104 or both. Pre-processing may include analog and/or digital filtering of the sensor signal as well as other signal processing techniques. The samples may be generated from the crash signal on a regular time basis, e.g. by regularly sampling the crash sensor signal and then provided to the first processing path.

At 204, for each sample received in the first processing path, a first digital representation indicative of a crash severity is generated. At 206, a crash occurrence is determined based on the first digital representation.

The first digital representation may be generated from the crash sensor sample based on a predetermined rule. The generating of the first digital representation may include the usage of a continuous function which provides a continuous transformation function in which the values of crash sensor samples are transformed to respective first digital representations. In some embodiments, the transformation function may include a transformation function with a continuous transformation regime and a non-continuous transformation regime. In the continuous transformation regime, each digital value of the sample is transformed in a continuous manner to a digital representation. For example the digital representation may be a difference between the value of the sample and a threshold value. In a non-continuous transformation regime, values may be transformed in a quantized manner such that one digital representation value may represent many sample values in a same regime. For example, one or more thresholds may be used to determine ranges for crash sample values. Each sample value within a specific range may then be transformed to one digital representation. In other words, the digital representation may be quantized to a plurality of levels wherein each level corresponds to a certain quantifier of a crash severity.

In one example, if a sample value is below a specific threshold, an assumption can be made that no crash is occurring. In such a case, the crash severity quantifier can be assumed to be zero since no indication of a possible crash is existing. If the sample value is however above this threshold value, a continuous digital representation may be used based on the difference between the sample value and the threshold value. Instead of a continuous representation, a representation with multiple quantization levels may be used in other embodiments.

Figure 3:
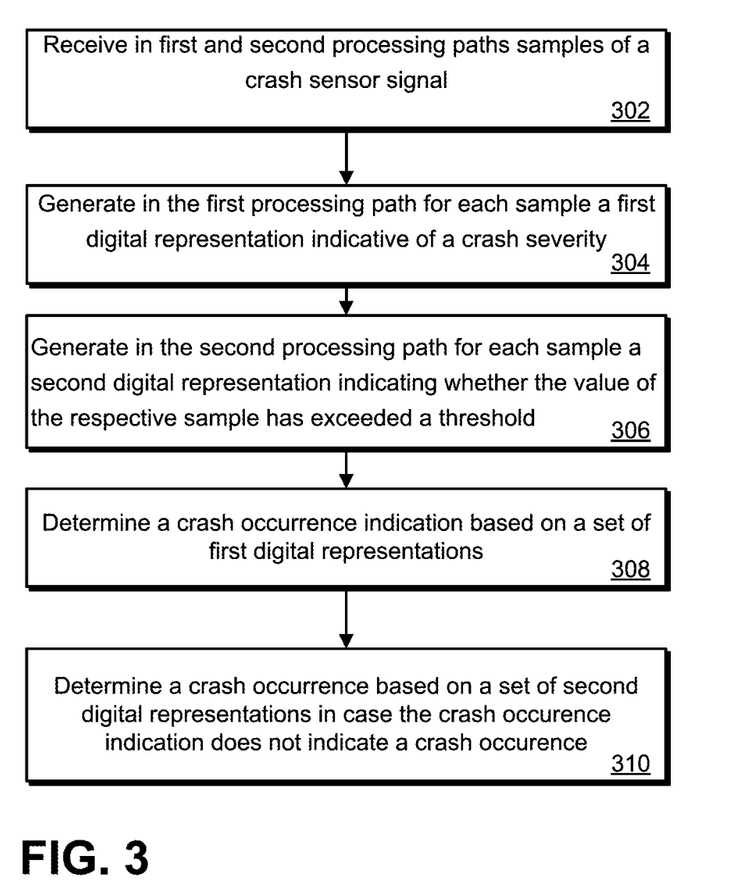
FIG. 3 shows a flow chart diagram according to an embodiment.

FIG. 3 shows a modification of the flow process of FIG. 2. In the flow process of FIG. 3, at 302 the samples of the crash sensor signal are received in first and second processing paths.

At 304, a first digital representation indicative of a crash severity is generated in the first processing path. At 306, a second digital representation is generated in the second processing path such that the second digital representation indicates for each sample whether a threshold is exceeded or not. At 308, a crash occurrence indication is determined based on a set of first digital representations generated in 304. In case the crash occurrence indication based on crash severity quantifiers does not indicate a crash, a crash occurrence is detected based on a set of second digital representations.

Figure 4:
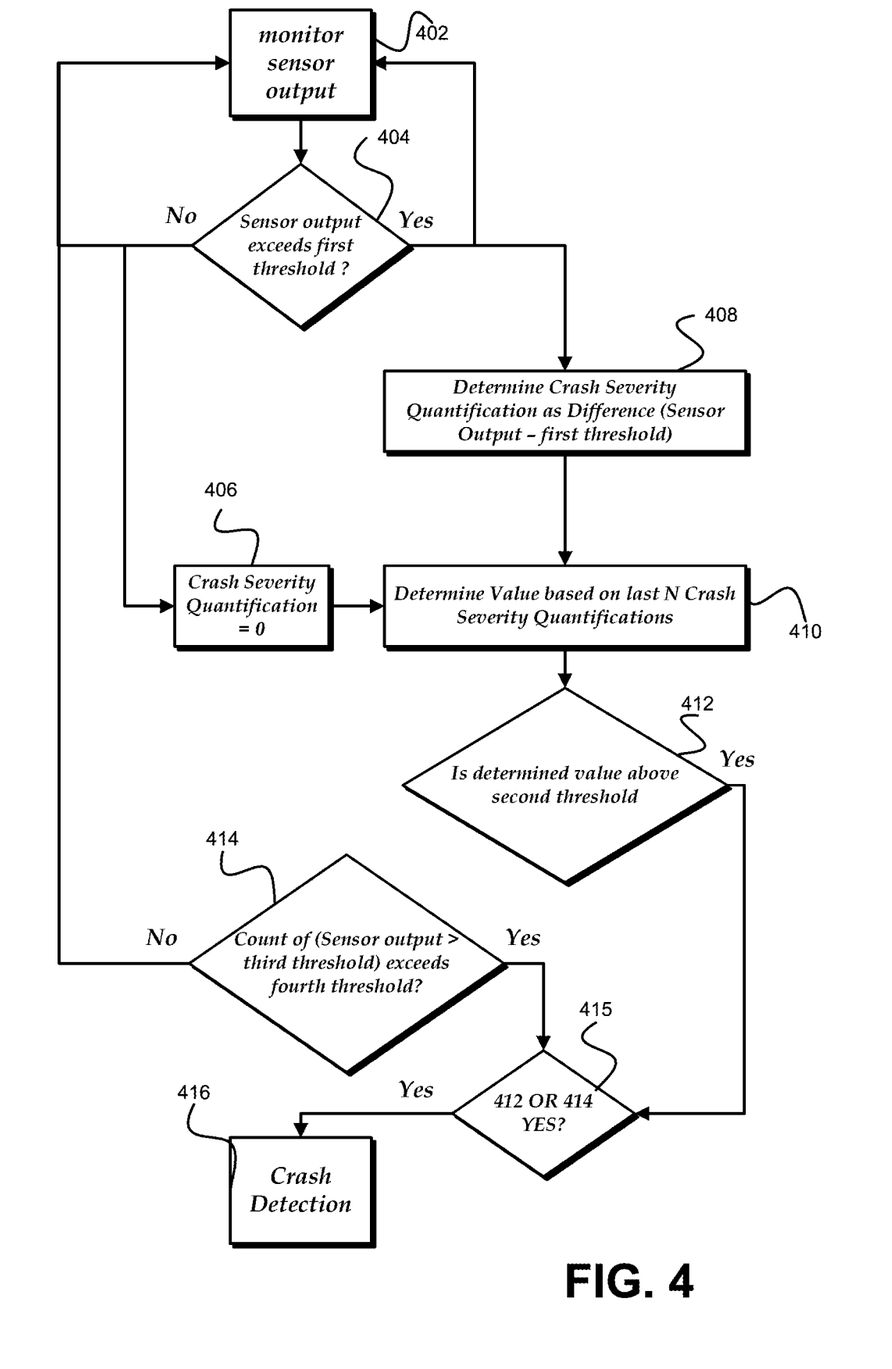
FIG. 4 shows a flow chart diagram according to an embodiment.

FIG. 4 shows one example to implement the crash detection described with respect to FIG. 3. At 402, sensor output is monitored and at 404 a decision is made whether the sensor output exceeds a first threshold or not. If the sensor output does not exceed the first threshold, the monitoring is continued and the crash severity quantifier is set to 0. If the sensor output is determined to have exceeded the threshold, the monitoring of the sensor output is continued and the crash severity quantifier is determined to be the difference between the sensor output and the first threshold. Based on the last N Crash severity quantifiers which could be either resulting from 406 or 408, a value which provides an indication of a crash occurrence is determined at 410. At 412 it is decided whether the value determined in 410 is above a second threshold. In parallel to the path established by 408, 410 and 412, it is counted how many sensor output samples exceed a third threshold and a decision is made in 414 whether the count of samples which are above the third threshold is above a fourth threshold or not. With reference to 415, if the decision in 412 that the determined value is above the second threshold is yes or the decision in 414 that the count is above the fourth threshold is yes or both of the decisions 412, 414 are yes, the crash is detected in 416. Thus, even though for example the decision made in 412 based on the crash severity quantifier may not have given an indication of a crash, the crash is detected in view of the parallel decision path which takes into account the count of samples which are above the third threshold.

Figure 5:
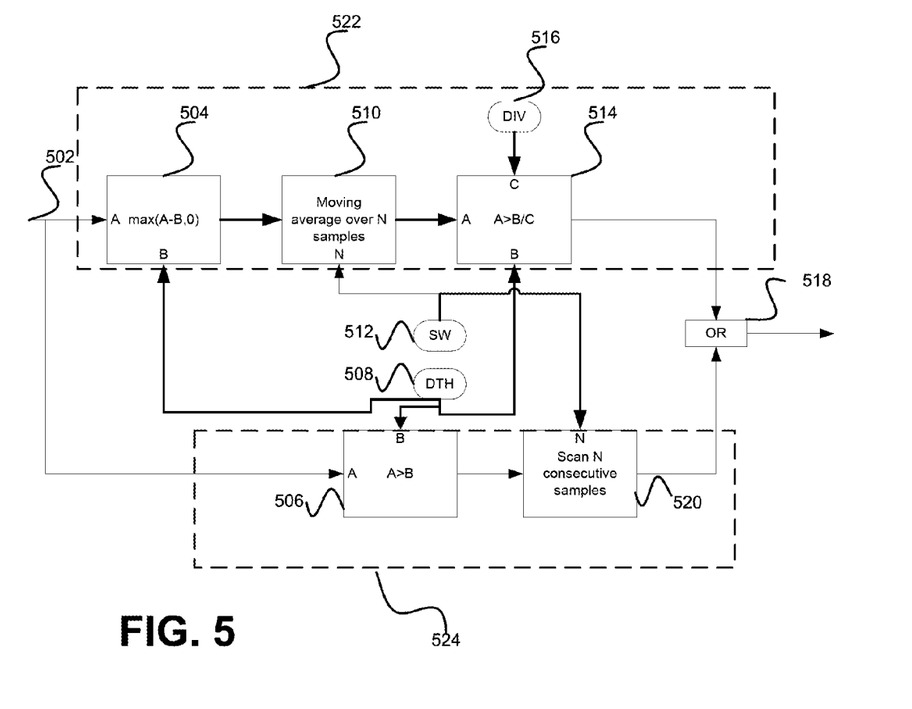
FIG. 5 shows a block diagram according to an embodiment.

FIG. 5 shows a block diagram which shows an embodiment implementing the flow diagram shown in FIG. 4 in a circuit. Samples of a filtered crash sensor signal 502 are input to a block 504 and a block 506. The block 504 determines for each sample the difference value between the signal value A and a first threshold B which is stored in a memory 508. The block 504 further determines the absolute maximum of the difference and zero and outputs this value as a crash signal quantifier value. In other words, if the signal value A is above the threshold B, the output signal of the block 504 is the difference between the signal value A and the threshold B, i.e. (A−B). If the sample value is below the threshold B, the output signal of block 504 is equal to zero. It is to be understood, that the output signal of 504 indicates a crash severity. When the signal from the crash sensor is low and therefore below the threshold B, a crash occurrence is not indicated and therefore any quantifier of a crash severity can be set to zero. If the crash occurrence is above the threshold B, the difference between the crash signal value A and the threshold B is a measure of how severe the vehicle is hit at the time corresponding to the sampled signal. The difference between the threshold B and the signal A therefore indicates the crash severity.

The output signal of block 504 is then input to a block 510 in order to determine a moving average. The set used for determining the moving average includes N samples which include the current output sample from block 504 and N−1 previous output samples from block 504. The number N may be programmable and include any integer number greater than 2. The number N may be stored in a memory 512. Furthermore, the output sample of block 504 may be stored at least for the time equivalent to N samples in order to determine the moving average based on the sample. Moving averaging is a concept known to a person skilled in the art. Therefore, the details are not described herein. However, it is to be noted that instead of moving averaging other filtering concepts may be used in the embodiments described herein.

After the moving average is determined, the block 510 provides the output to a block 514. Block 514 determines whether the signal output by block 510 exceeds a threshold. The value of the threshold is in the embodiment equal to the quotient of the value B and a constant C, i.e. B/C. The constant C may be stored as digital data in a memory 516. Based on the result of the determination, the block 514 outputs a logical value "1" if the threshold value is exceeded by the signal input to block 514. In case the signal input to block 514 is determined as being lower than the threshold value, a logical value "0" is output. The binary output signal is then applied to an "OR"-Block 518.

It is to be noted that the processing from block 504 to block 514 forms a first processing path 522. A second processing path 524 parallel to the processing path 522 is provided by blocks 506 and 520 as will be described below.

As outlined above, the block 506 receives samples of the filtered crash sensor signal 502. The signal value A of the samples are compared in block 506 with the threshold value B. Thus, in the embodiment of FIG. 5, the blocks 504 and 506 use a same threshold value. However in other embodiments, the threshold value used in the block 504 may be different to the threshold value used in the block 506. Dependent on the result of the comparison of the value of the input samples A with the value of the threshold B, the block 506 outputs a binary signal. In other words in case the value A of the input samples exceed the threshold value B, a logical value "1" is output by block 506. In case the value A of the input samples is equal or lower than the threshold value B, a logical value "0" is output by block 506. In the block 520, the last N logical values output by the block 506 are scanned to determine how many logical values "1" occurred amongst the last N signals. In other words the block 520 is capable to determine how many times the threshold value B has been exceeded amongst the last N samples. The block 520 may for example use a counter to continuously add or deduct a counter number based on the value of the signals output by block 506. In case the scanning of the last N samples determines that a specific threshold value has been exceeded, the block 520 outputs a binary signal with logical value "1".

Block 518 performs an "OR" function of the signal output by block 514 with the signal output by block 520. Thus, in case one of the two paths 522, 524 determines a logical "1" or both of the paths 522, 524 determine a logical "1", an output signal with logical value "1" is output by block 518 to the airbag sensor which results in firing the airbag. In case both paths 522 and 524 output a logical "0" to the "OR"-block 518, a logical "0" will be output by "OR"-block 518.

Figure 6:
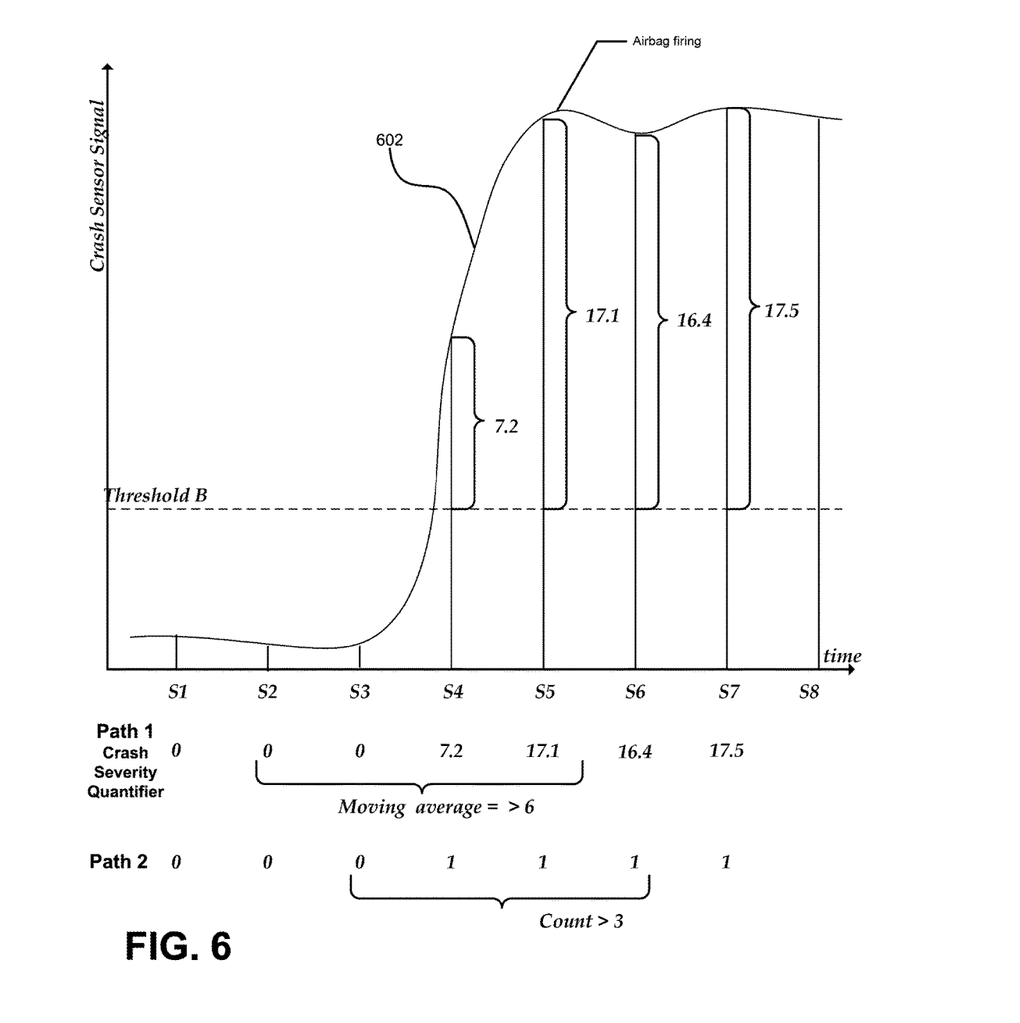
FIG. 6 shows a diagram according to an embodiment.

In order to show an example operation of the system of FIG. 5, FIG. 6 shows as a first example a crash sensor signal 602 corresponding to a severe crash. The crash sensor signal is shown in arbitrary units over time. The crash sensor signal 602 is sampled at sampling times S1 to S8. At each sampling point, a respective sample is captured and compared to the threshold value B shown in FIG. 6. The crash is assumed to occur around S3. A first sequence of values labeled with "Path 1" corresponds to the output sequence of block 504. It is assumed that in block 514, the moving average of N=4 samples is compared to a threshold value of 6. It can be seen that at S5, the moving average exceeds the preset threshold value of 6 and therefore a signal to fire the airbag is output. For comparison, the output sequence of block 506 is shown labeled with "Path 2". In the example it is assumed that block 520 requires 3 consecutive samples with logical "1" to output a logical "1". It can be seen that at S6 the requirement from path 2 is fulfilled. However, at that time, the airbag is already fired in view of the moving average criteria of path 1. While FIG. 5 shows path 1 to detect the crash earlier than path 2 by one sampling time period, it is to be noted that in general path 1 can detect severe crash occurrences earlier by more than one sampling time period. Depending on the specific implementation, path 1 may be earlier by three or more sampling time periods.

Figure 7:
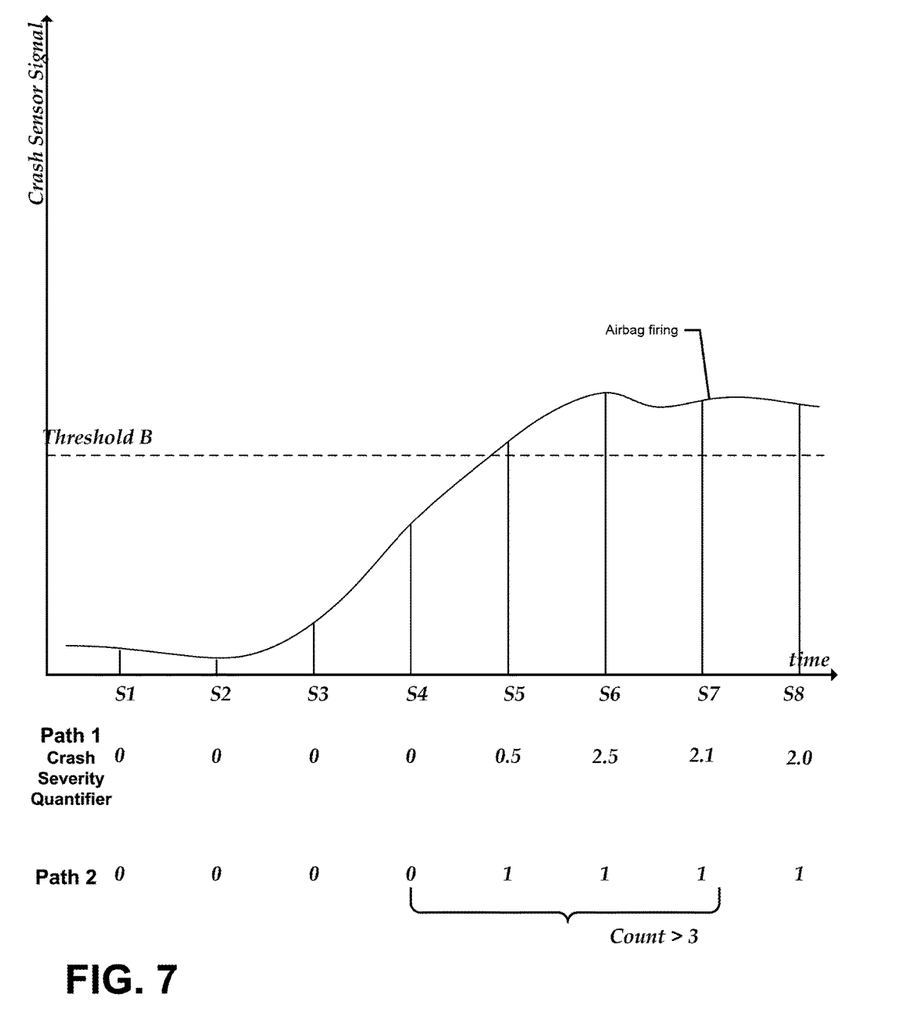
FIG. 7 shows a diagram according to an embodiment.

Referring now to FIG. 7, an example of a crash sensor signal 702 corresponding to a less severe crash is shown.

It becomes clear that in the example of FIG. 7, path 1 will not detect the crash occurrence since the crash signal values are only slightly above the threshold value B. However, path 2 will detect the crash at S7 when the predetermined threshold of 3 is exceeded.

Figure 8:
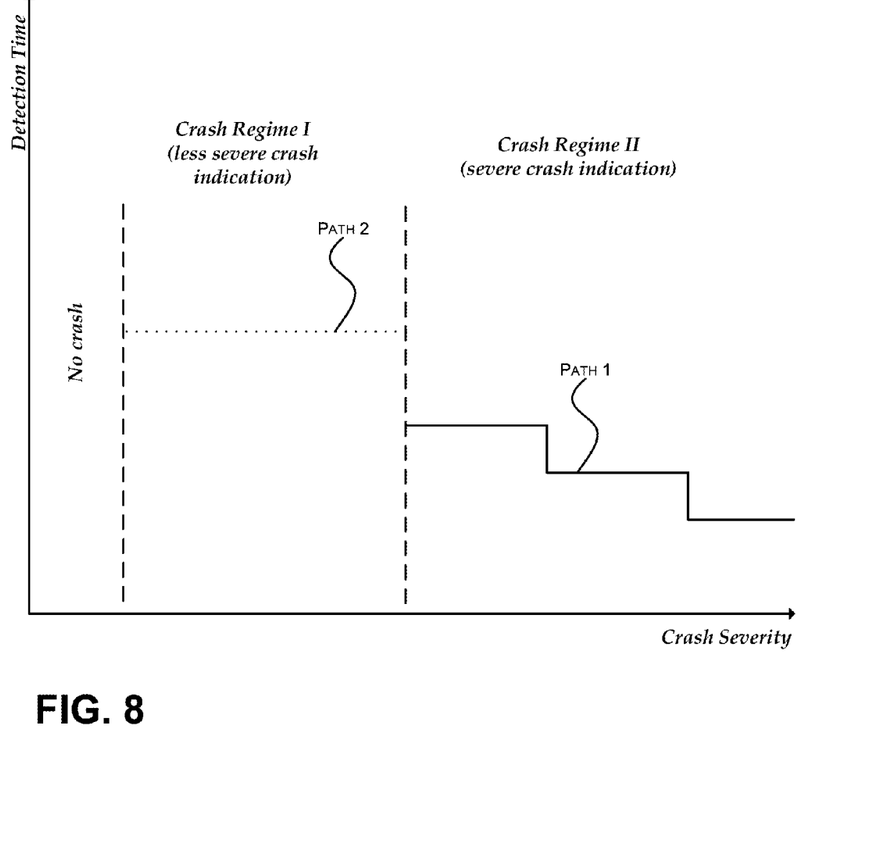
FIG. 8 shows a diagram according to an embodiment.

FIG. 8 shows that depending on the severity of the crash, different regimes can be identified. In a first crash regime corresponding to less severe crash situations, the airbag is fired based on an output of path 2. In a second crash regime, the airbag is fired much earlier based on the output of path 1.

The above new concept implemented in path 1 may be regarded as addition to existing algorithm such as the algorithm provided in path 2. The checking criteria in the path 1 may be also seen as a Crash Severity Quantifier (CSQ). The Crash Severity Quantifier is a parallel path to the algorithm of path 2 which may be referred to Consecutive Threshold Crossings (QTC). The Crash Severity Quantifier checks by how much the threshold was crossed, instead of just checking if it was crossed or not. This quantity is then averaged, e.g. Moving Average, and then checked for crossing a further threshold. If the further threshold is crossed, the crash is detected. If the Crash Severity Quantifier does not detect a crash because the second threshold was not crossed, due to a weak crash sensor signal, but the crash sensor signal is still above the threshold value B, the CTC will detect the crash. If the acceleration signal is strong, the Crash Severity Quantifier will detect the crash earlier than the Consecutive Threshold Crossings. By "O"-ring both algorithms outputs, the respective weaknesses of both are addressed by the respective other path.

The above concept therefore balances the two contradictory criteria of crash detection time and avoidance of false crash detection. With the crash detection time, the goal is to reduce to a minimum the time from which the crash occurs until it is detected. The embedded safing engine is gating the deployment of airbags until it detects the crash. Ideally, the reaction time is as fast as possible to avoid delay an Airbag deployment. On the other side, the criteria of probability of false alarm avoids report a crash if there was just a crossing of the threshold due to bad road condition or low speed accident. This criterion is of lower priority as the Airbag deployment is gated by the main microcontroller which runs a smarter crash detection algorithm, based on several sensors.

The two criteria are contradictory. Having the crash detection active all the time provides a very fast detection time, but almost 100% probability of false alarm. On the other hand, never detecting a crash has the advantage of never having false alarm, but never allowing deployment. The above solution provides a solution in that it attempts to keep both criteria to a minimum with limited resource.

While a new concept for determining crash occurrence has been described herein, it is to be noted that the concept may be equally applied to other systems in which an occurrence of a potential abnormal situation is detected based on sensor signals within a short time frame.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation such as an analog signal representation, a digital signal representation, a modulation onto carrier signals etc. The term "information" may in addition to any form of digital information also include other forms of representing information. The term "entity" or "unit" may in embodiments include any device, apparatus circuits, hardware, software, firmware, chips or other semiconductors as well as logical units or physical implementations of protocol layers etc. Furthermore the terms "coupled" or "connected" may be interpreted in a broad sense not only covering direct but also indirect coupling.

It is further to be noted that embodiments described in combination with specific entities may in addition to an implementation in these entity also include one or more implementations in one or more sub-entities or sub-divisions of said described entity.

The accompanying drawings that form a part hereof show by way of illustration, and not of limitation, specific embodiments in which the subject matter may be practiced.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

Furthermore, it is intended to include in this detailed description also one or more of described features, elements etc. in a reversed or interchanged manner unless otherwise noted.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple sub-steps. Such sub-steps may be included and part of the disclosure of this single step unless explicitly excluded.

What is claimed is:

1. A device including a controller having a plurality of crash determining processing paths that are configured to process input samples, the device comprising:
   a first crash determining processing path of the plurality of crash determining processing paths of the controller that is configured to receive the input samples that are generated from a sensor signal of a crash sensor and to determine a crash in a first crash severity regime based on an amount at which the input samples exceed a first threshold value; and
   a second crash determining processing path of the plurality of crash determining processing paths of the controller that is configured to receive the input samples that are generated from the sensor signal of the crash sensor and to determine the crash in a second crash severity regime based on a quantity of samples within a sequence of the input samples that exceed a second threshold value.

2. The device according to claim 1, wherein the first crash determining processing path is configured to provide an indication of the crash based on the amount that the input samples exceed the first threshold value; and
   wherein the second crash determining processing path is configured to provide an indication of the crash based on the quantity of samples within the sequence of the input samples that exceed the second threshold value.

3. The device according to claim 2, wherein the first threshold value and the second threshold value are equal.

4. The device according to claim 3, wherein the second crash determining processing path is configured to determine an occurrence of the crash when the first crash determining processing path is not indicating an occurrence of the crash.

5. The device according to claim 3, wherein the first crash determining processing path is configured to determine an occurrence of the crash based on a crash severity quantifier value assigned to each of the input samples.

6. The device according to claim 1, wherein the second crash determining processing path has a minimum crash determination time and wherein the first crash determining processing path is configured to determine an occurrence of the crash in the first crash severity regime within a time shorter than the minimum crash determination time.

7. The device according to claim 6, wherein the first crash determining processing path is configured to determine the occurrence of the crash within the time shorter than the minimum crash determination based on a severity in which the amount of the input samples exceeds the first threshold value.

8. The device according to claim 1, wherein the first threshold value and the second threshold value are equal.

9. The device according to claim 1, wherein the first threshold value and the second threshold value are different.

10. The device according to claim 1, wherein:
the first crash determining processing path is configured to determine an occurrence of the crash earlier than a determination of the occurrence of the crash by the second crash determining processing path when the amount exceeds the first threshold value by a first value; and
the second crash determining processing path is configured to determine the occurrence of the crash earlier than a determination of the occurrence of the crash by the first crash determining processing path when the amount exceeds the first threshold value by a second value less than the first value.

* * * * *